UNITED STATES PATENT OFFICE.

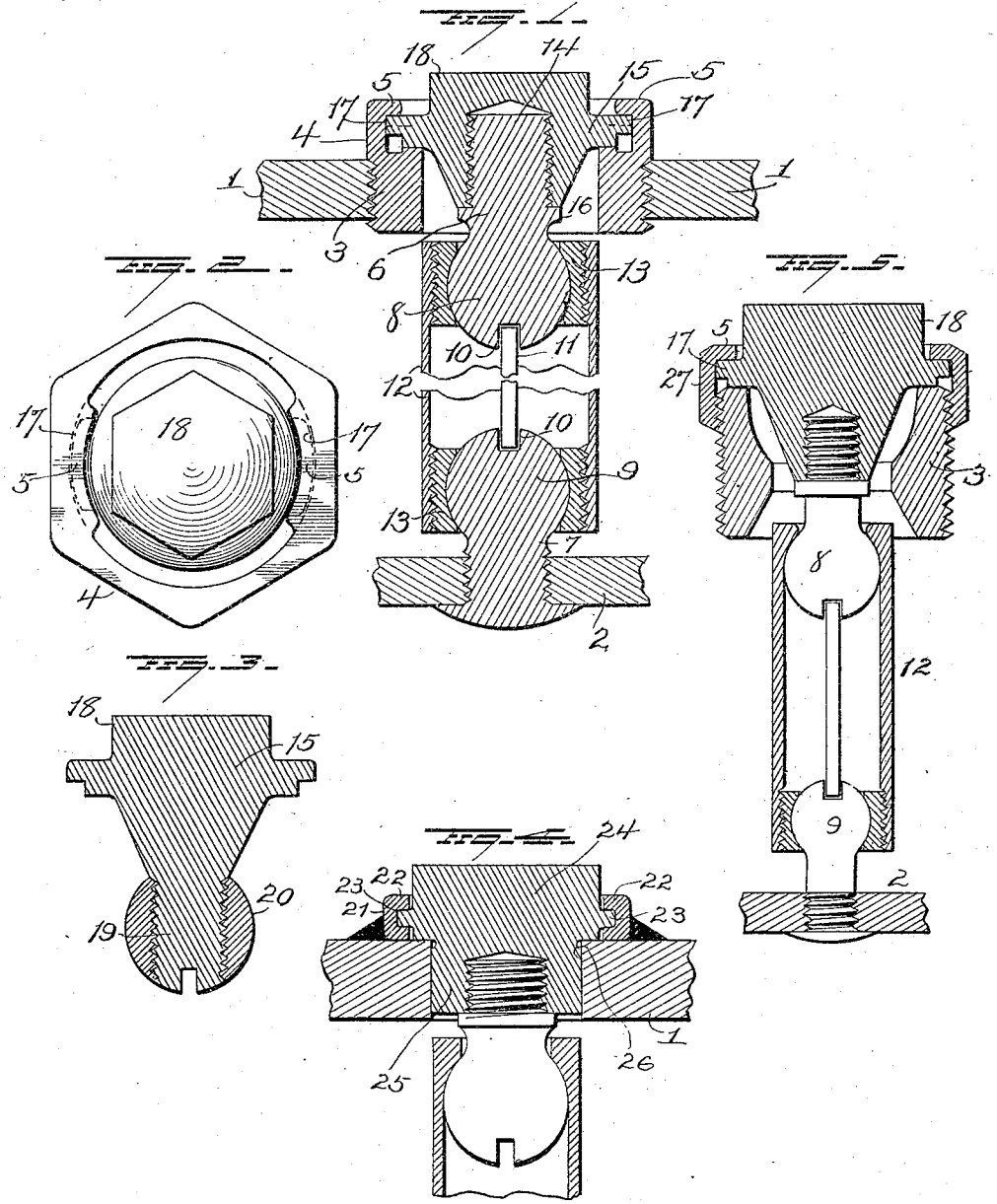

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,874.

Specification of Letters Patent.

Patented Mar. 4, 1919.

Application filed May 3, 1918. Serial No. 232,320.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to that type in which the staybolt comprises a plurality of connected members,—the object of the invention being to facilitate the testing of such a staybolt without dismembering the same or removing any part thereof.

With this and other objects in view, the invention consists in certain novel features of construction and combinations of parts as hereinafter set forth and pointed out in the claims.

In the accompanying drawings, Figure 1 is a sectional view showing my improvements. Fig. 2 is a plan view, and Figs. 3, 4 and 5 are views illustrating modifications.

1 represents an outer boiler sheet and 2 an inner boiler sheet. The outer boiler sheet is adapted for the reception of a bearing member 3 which may be made in the form of a threaded sleeve having an extension 4 provided interiorly with segmental shoulders 5, the latter having inner beveled faces.

The staybolt comprises two stud portions 6 and 7 having rounded or spherical heads 8—9 and these heads are made with sockets or slots 10 for the reception of the end portions of a connecting bar or link 11. The heads 8—9 of the studs 6—7 are inclosed by a tubular body member or sleeve 12 which is internally threaded at its respective ends to receive bushings 13 having curved inner faces to form bearings for the spherical headed heads 8 and 9 of the studs. The headed stud 7 may be screwed through a suitable hole in the inner boiler sheet 2 and the headed stud 6 is provided with a threaded shank 14 to enter a threaded socket in a cap member 15,—said stud 6 being also provided with an annular flange 16 to engage the inner end of said cap member. The cap member 15 is seated on the bearing member 3 and is provided with segmental shoulders 17 having cam outer faces to engage behind the segmental shoulders 5 of the member 3, whereby said cap member is normally locked in place. An angular head 18 may be formed on the cap member for the reception of a wrench.

After turning the cap member until the segmental shoulders 17 shall have moved out of line with the segmental shoulders 5, the operator may, with the use of a suitable tool, attempt to pry said cap member from the bearing member 3 and if he is successful in doing this, the fact that the bolt is broken will be indicated. It is apparent that if the bolt is whole, the operator may turn the cap and quickly again lock the same in place.

In the form of the invention shown in Fig. 3, the cap member is provided with a threaded shank 19 at its inner end and on this shank an annulus 20 is screwed and provided with an exterior face having a bearing within one end of the tubular body portion 12 of the staybolt structure.

In Fig. 4 I have shown a ring or sleeve 21 welded to the outer boiler sheet and provided with internal segmental shoulders 22 to receive and coöperate with segmental shoulders 23 on a cap member 24. This cap member is made with a part 25 mounted to turn in a hole 26 in the outer boiler sheet 1,—the part 25 being made with a threaded socket to receive the threaded shank on the stud member 6 of the staybolt.

Instead of forming an integral shouldered extension on the sleeve 3, I may provide a ring 27 threaded on the sleeve 3 and provided with the internal shoulders to be engaged by the segmental shoulders on the cap member. If desired the bushing 13 at the outer end of the tubular body 12 may be omitted and the bearing for the head on the stud 6 provided in the inner wall of said body 12 as shown in Figs. 4 and 5.

Having fully described my invention what I claim as new and desire to secure by Letters-Patent, is:

1. The combination with outer and inner boiler sheets, of a flexible staybolt comprising headed studs and a tubular member in which said studs are mounted, one of said studs adapted for connection with the inner boiler sheet, a cap member connected with the other headed stud and provided with segmental shoulders, and an annular member attached to the outer boiler sheet and provided with segmental shoulders for cooperation with the segmental shoulders on said cap member.

2. In a staybolt structure, the combination of a flexible staybolt comprising two headed studs spaced apart, a tubular body portion receiving the heads of said studs and provided with bearings therefor, a bar or link connecting said headed studs, one of said headed studs adapted for connection with an inner boiler sheet, a ring or sleeve attachable to an outer boiler sheet and provided with segmental shoulders, and a cap member connected with one of said headed studs and entering said ring or sleeve and having a bearing therein, said cap member provided with segmental shoulders for coöperation with the segmental shoulders in the ring or sleeve to normally lock said cap member in place.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."